United States Patent Office 3,505,410
Patented Apr. 7, 1970

3,505,410
TRIFLUOROMETHYL ETHYL ETHER AND PROCESS FOR MAKING TRIFLUOROMETHYL ETHERS
Otto Scherer, Bad Soden, Taunus, and Hans Millauer, Frankfurt am Main, Germany, assignors to Farbwerke Hoechst Aktiengesellschaft vormals Meister Lucius & Bruning, Frankfurt am Main, Germany, a corporation of Germany
No Drawing. Filed May 7, 1968, Ser. No. 727,354
Claims priority, application Germany, May 9, 1967, F 52,362
Int. Cl. C07c 43/00, 43/04
U.S. Cl. 260—614    5 Claims

ABSTRACT OF THE DISCLOSURE

Process for preparing trifluoromethyl alkyl ethers by reacting a compound of the formula $$R'-SO_2-O-R$$

or $$R-O-SO_2-O-R$$

wherein R represents a methyl or ethyl group and R' stands for an alkyl group having 1 to 4 carbon atoms or an aryl group, with an alkali metal fluoride and carbonyl difluoride.

---

The present invention relates to trifluoromethyl ethyl ether and a process for making trifluoromethyl ethers.

We have found that trifluoromethyl ethers of the general Formula I $$F_3C-O-R \qquad (I)$$

in which R stands for a methyl or ethyl radical, can be obtained by reacting a compound of the general Formula II $$X-R \qquad (II)$$

in which R has the meaning given above and X is (a) a sulfonic acid radical of the general Formula III $$R'-SO_2-O- \qquad (III)$$

in which R' represents an alkyl radical with 1 to 4 carbon atoms or an aryl radical, or (b) an alkylsulfuric acid radical of the general Formula IV $$R-O-SO_2-O- \qquad (IV)$$

in which R has the meaning given above, with an alkali metal fluoride, preferably potassium fluoride, and carbonyl difluoride in an inert solvent at a temperature within the range of from about 20° C. to 120° C., advantageously about 30° C. to about 60° C.

As to the quantitative proportions of the substances to be reacted, about 0.7 to about 1.3 moles of alkali metal fluoride and about 0.7 to about 1.3 moles of compound II are used for each mole of carbonyl difluoride.

As compounds of the above Formula II there may be used, for example, alkylsulfonic acid esters, for example methyl mesylate, ethyl mesylate, ethylsulfonic acid methy ester, propylsulfonic acid ethyl ester, arylsulfonic acid esters, for example benzene-sulfonic acid methyl ester, methyl tosylate, ethyl tosylate, or dimethyl- or diethyl sulfate, the last two compounds being preferred. An alkali metal fluorides, rubidium fluoride, cesium fluoride and advantageously potassium fluoride may be used. Suitable solvents are, for example, the dimethyl or diethyl ethers of mono-, di- or triethylene glycol, tetrahydrofurane and acetonitrile, advantageously diethylene glycol dimethyl ether.

The reaction is carried out in a reaction vessel (autoclave) provided with stirring means by placing, for example, alkali metal fluoride, compound II and solvent in the reaction vessel and then introducing carbonyl difluoride under pressure while stirring. The reaction mixture is stirred for about another 24 to 96 hours, the reaction temperature being maintained at about 20 to 120° C., advantageously about 30 to 60° C., by supply of heat.

The reaction product may be isolated by distilling off the volatile reaction products or expelling them with steam, washing them until free from acid, drying them and purifying them by fractional distillation.

The products obtained by the process in accordance with the invetion may be used as propellants for aerosols or as refrigerating agents. It is also possible to chlorinate the trifluoromethyl ethyl ether which is a new compound. By treating the trifluoromethyl chlorethyl ether so obtained with strong bases, the corresponding vinyl compound is obtained which can be polymerized to yield fluorinated polymers. The trifluoromethyl methyl ether may also be chlorinated. The compound so obtained makes a valuable inhaling narcotic.

The following examples serve to illustrate the invention, but are not intended to limit it.

EXAMPLE 1

505 grams (3.60 moles) dimethyl sulfate, 232 grams (3.60 moles) potassium fluoride and 800 milliliters diethylene glycol dimethyl ether were placed in a heatable autoclave provided with stirring means. Into this mixture 198 grams (3.00 moles) carbonyl difluoride were introduced at room temperature while stirring. Stirring was continued at 50° C. for 62 hours, the pressure dropping from 17 atmospheres gage to 6 atmospheres gage. The volatile reaction products were collected in a cooling trap and isolated by fractional distillation. 270 grams trifluoromethyl methyl ether boiling at −30° to 26° C. were obtained, which corresponded to a yield of 90% of the theoretical, calculated on the carbonyl difluoride used as starting material.

When in this example, instead of dimethyl sulfate, equivalent amounts of methyl mesylate, ethylsulfonic acid methyl ester or methyl tosylate were used, the trifluoromethyl methyl ether was obtained in a somewhat smaller yield.

EXAMPLE 2

554 grams (3.60 moles) diethyl sulfate, 209 grams (3.60 moles) potassium fluoride and 1000 milliliters diethylene glycol dimethyl ether were placed in a heatable atuoclave provided with stirring means. After introducing 198 grams (2.00 moles) carbonyl difluoride under pressure, the mixture was stirred at 50° C. for 66 hours. The volatile reaction products were collected in a cooling trap, the temperature of the autoclave being raised to 100° C. The condensate was separated by fractional distillation. 147 grams trifluoromethyl ethyl ether boiling at 2 to 5° C. were obtained, which corresponded to a yield of 43% of the theoretical, calculated on the carbonyl difluoride used as starting material.

When, instead of diethyl sulfate, an equivalent amount of ethyl tosylate was used, the same compound was obtained in a somewhat smaller yield.

What is claimed is:
1. A process for preparing trifluoromethyl ethers of the formula

$$F_3C-O-R \qquad (I)$$

wherein R represents methyl or ethyl, which comprises reacting a compound of the formula $$X-R \qquad (II)$$

in which R has the meaning defined above and X represents a sulfonic acid radical of the formula $$R'-SO_2-O- \qquad (III)$$

wherein R' stands for alkyl having 1 to 4 carbon atoms or aryl, or an alkylsulfuric acid radical of the formula $$R\text{—}O\text{—}SO_2\text{—}O\text{—} \qquad (IV)$$

wherein R has the meaning as defined above, with an alkali metal fluoride and carbonyl difluoride in an inert solvent selected from the group consisting of dimethyl and diethyl ethers of mono-, di- and triethylene glycol, tetrahydrofurane nad aceto-nitrile at a temperature between 20 and 120° C.

2. The process as claimed in claim 1, wherein dimethyl sulfate or diethyl sulfate is used as compound of Formula II.

3. The process as claimed in claim 1, wherein potassium fluoride is used as alkali metal fluoride.

4. The process as claimed in claim 1, wherein the reaction is carried out at a temperature between 30° and 60° C.

5. The process as claimed in claim 1, wherein about 0.7 to 1.3 moles of alkali metal fluoride and about 0.7 to 1.3 moles of the compound of Formula II are used per mole of carbonyl difluoride.

References Cited

UNITED STATES PATENTS 2,957,001  10/1960  Smith.
3,362,180  1/1968   Eiseman.
3,394,878  7/1968   Eiseman.

OTHER REFERENCES

Makarov et al.: Doklady, Akad., Nauk U.S.S.R. 141, 357–60 (1961).

Allison et al.: Jour. Amer. Chem. Soc. 81, pp. 1089–91 (1959).

LEON ZITVER, Primary Examiner

H. T. MARS, Assistant Examiner

U.S. Cl. X.R.

252—305, 67; 260—91.1, 999